Patented Apr. 28, 1936

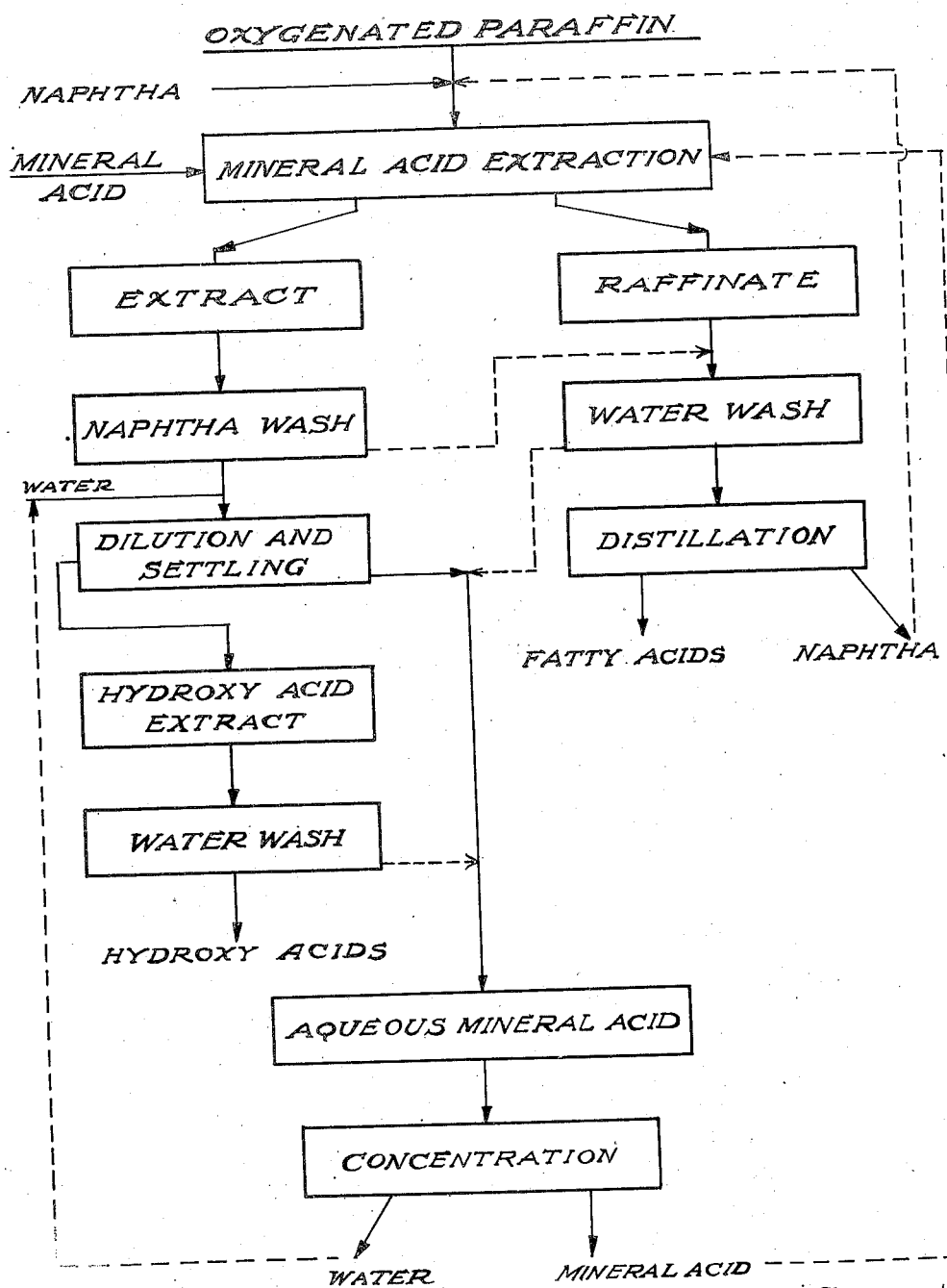

2,038,617

UNITED STATES PATENT OFFICE 2,038,617

METHOD FOR REFINING FATTY ACIDS

Hans G. Vesterdal, Elizabeth, N. J., assignor to Standard Oil Development Company, a corporation of Delaware Application December 1, 1933, Serial No. 700,458

10 Claims. (Cl. 260—122)

This invention relates to an improved method for refining fatty acids, and more particularly to means for separating fatty acids from other oxygen containing products of the limited oxidation of paraffins, especially of high molecular weight paraffins such as paraffin wax, petrolatum, and petroleum white oils.

The use of relatively large amounts of phosphoric acid to separate oxygen containing hydrocarbon derivatives from their solution in hydrocarbon oils is shown in U. S. Patent 1,820,907 to H. E. Buc. It has now been found that by the use of relatively much smaller amounts of phosphoric acid, or of other mineral acids such as sulfuric acid, various oxygen containing organic compounds can be separated from admixture with fatty acids as in the products obtained by the limited oxidation of hydrocarbons. The drawing is a diagrammatic representation of a suitable flow plan for applying the process of the present invention to the refining of fatty acids obtained by partial oxidation of paraffins.

Referring to the drawing, a mixture of oxygen derivatives of hydrocarbons such as a wax oxidation product containing fatty acids and other oxygenated organic compounds such as lactones, alcohols, esters and the like is mixed with a suitable amount of naphtha and is then passed in countercurrent contact with a suitable mineral acid such as concentrated phosphoric acid. The phosphoric acid removes preferentially the oxygenated products other than fatty acids from the naphtha solution together with a small amount of fatty acids. This phosphoric acid extract may then be washed with a small amount of naphtha. The resulting naphtha solution of fatty acids may be added to the raffinate. The naphtha solution (raffinate) is then washed with water to remove any small amount of phosphoric acid contained therein. The fatty acids may then be separated from the naphtha solution by any suitable method, for example, the naphtha may be removed by distillation and recycled. If the crude oxidation products originally used contained unoxidized high boiling hydrocarbons, the fatty acids may be separated from these by suitable saponification, water extraction and re-acidulation steps as are commonly practiced in this art.

The extract consisting primarily of hydroxy fatty acids may be separated from the phosphoric acid by dilution with a small amount of water. On standing the upper layer of organic materials separates from a lower aqueous layer of phosphoric acid. The upper layer may be withdrawn and washed with water to remove residual traces of phosphoric acid. The diluted phosphoric acid from the separator with, if desired, the added wash water is then reconcentrated, by suitable methods, such as by removal of water in a vacuum still. The concentrated acid may suitably be recycled. The aqueous distillate may contain a small amount of oxygenated organic compounds which were soluble in the diluted phosphoric acid. This distillate is condensed and any water insoluble organic material may be separated as an upper layer from the condensate. The aqueous distillate may also contain a small amount of water soluble organic compounds and may suitably be reused to dilute the phosphoric acid extract, or the water soluble organic compound may be separately recovered, as by extraction from the aqueous solution with a water insoluble organic solvent such as carbon tetrachloride.

The mineral acid used for the extraction should be concentrated and is preferably of about 80 to 90% or 95% strength. The amount of phosphoric acid used will vary according to the content of fatty acid and other oxygenated products in the material treated, but will ordinarily be in a volume much smaller than that of the material treated and may suitably be as little as 1/10 to 1/20 of this volume, or even less. While countercurrent treating and washing steps have been described with the drawing, it is understood that the process may also be conducted with any of such steps in parallel flow or with batch agitators. A number of agitators may also be used in series for any one step.

The invention is further illustrated by the following example:

Example 1

Paraffin wax is oxidized to an acid value of about 50 by blowing with air at 130 to 160° C. in the presence of a suitable oxidation catalyst such as about ½% sodium carbonate and ½% manganese soap. The crude product is saponified with aqueous potassium hydroxide for several hours at the boiling point of the solution. On cooling, the solution is made acid with dilute hydrochloric and 2030 grams of the liberated acids are taken up in two volumes of naphtha. The naphtha solution is then shaken thoroughly with 1/20 volume of 85% phosphoric acid. On standing, the phosphoric acid settles out and removes most of the hydroxy acids from the naphtha solution. When the phosphoric acid layer has been drawn off, it is shaken up with fresh naphtha several times to extract from it any fatty acids which have been mechanically occluded by the acid. The phosphoric acid layer is finally diluted with sufficient water to give about 60 to 70% strength phosphoric acid based only on the water and phosphoric acid content of the mixture. Naphtha or some other low boiling solvent for the hydroxy acids is also added and the liberated hydroxy acids are separated as an upper layer. The extract is washed free of inorganic acids and then dried. The solvent is then removed at as low a temperature as possible. There is obtained as the residue of this distillation 159.5 grams of an oxygenated product consisting largely of hydroxy fatty acids. This product also contains a substantial proportion of esters and other oxidation products derived from the wax. Inspections indicate that the crude fatty acids contain about 29% hydroxy acid and the extract about 63%.

The upper layer or naphtha solution resulting from the extraction with strong phosphoric acid is distilled under vacuum to remove the naphtha, leaving the fatty acid raffinate as the residue.

The hydroxy acid extract may be sulfated and neutralized with suitable bases, such as sodium carbonate, to prepare detergents and wetting agents suitable for use even in hard water, and similar in many respects to sulfated castor oil acids.

Mineral acids may also be used as described above for the treatment of the acid fraction obtained by saponification of the crude oxygenation product and re-acidification of the resulting soaps.

The refined fatty acids secured by this invention are greatly improved in color, odor and stability, and may be used to prepare soaps which are much superior to those obtained from the crude fatty acids obtained by ordinary saponification and re-acidulation of partially oxidized paraffin wax.

The use of sulfuric acid for refining oxidized wax acid is illustrated by the following example:

*Example 2*

250 cc. of a crude oxidation product of paraffin wax prepared as described in Example 1 is dissolved in 750 cc. of a 56° Baumé petroleum naphtha which is inert to concentrated sulfuric acid. To 200 cc. of this solution are added with stirring 5 cc. of 80% strength sulfuric acid. The mixture is allowed to stand for about an hour and separates into two layers, an upper layer of the naphtha solution and a lower layer containing substantially all the sulfuric acid and 20 cc. of a hydroxy acid extract. Refined fatty acids may then be recovered from the naphtha solution by any suitable method, such as that described in the above example. Unsulfated oxy organic compounds may be secured by diluting the acid extract with water. A mild hydrolysis may be desirable for recovery of all the extracted oxy compounds. Very good sulfated detergents may be prepared, however, by adding an excess of 95% strength sulfuric acid directly to the total sulfuric acid extract, heating the mixture to 90 to 95° C. for about two hours, and then neutralizing with caustic soda or sodium carbonate. The resulting soaps are at least equivalent to sulfated castor oil acid soaps for use in hard water.

This invention may also be applied to the crude wax oxidation products or to other fractions thereof obtained by distillation or extraction with other solvents such as lower aliphatic alcohols. For example, methyl alcohol containing 5 to 10% of water may be used to extract substantially all oxygenated products from the unoxidized wax and the extract may be refined as described herein.

This invention is not to be limited to any specific examples which have been presented herein solely for purpose of illustration but is limited only by the following claims in which it is desired to claim all novelty insofar as the prior art permits.

I claim:

1. Method for separating hydroxy aliphatic acids from fatty acids comprising contacting a mixture of said fatty acids and said hydroxy acids with concentrated phosphoric acid in a volume substantially less than that of said mixture, permitting the separation of layers and separately withdrawing a resulting layer containing mainly phosphoric acid and said hydroxy acids from a remaining layer containing said fatty acids.

2. Method according to claim 1 in which the mixture of fatty acids and hydroxy aliphatic acids consists of a solution of said acids in naphtha.

3. Method according to claim 1 in which said mixture of organic acids is a product of the limited oxidation of paraffin hydrocarbons.

4. Method according to claim 1 in wich said mixture of organic acids is a product of the oxidation of paraffin wax at 130 to 160° C. with oxygen to an acid value of about 50.

5. Method for separating fatty acids from other oxygenated products comprising dissolving partially oxidized wax in petroleum naphtha and selectively extracting products more oxidized than fatty acids therefrom with concentrated phosphoric acid in a volume substantially less than that of said partially oxidized wax.

6. Method for refining crude fatty acids produced by partial oxidation of paraffin hydrocarbons comprising selectively extracting other oxy organic compounds from said crude acids with concentrated phosphoric acid in a volume substantially less than that of said crude acids.

7. Method according to claim 6 in which the volume of said phosphoric acid is from about 1/10 to 1/40 of the volume of said crude fatty acids.

8. Method according to claim 6 in which said crude fatty acids are obtained by saponification of the partial oxidation product.

9. Method for separating fatty acids from other oxygenated products comprising separating oxygenated compounds from partially oxidized paraffin wax by means of a selective solvent and selectively extracting products more oxidized than fatty acids from said separated oxygenated compounds with concentrated phosphoric acid in a volume substantially less than that of said oxygenated compounds.

10. Method according to claim 9 in which said selective solvent is aqueous methyl alcohol containing 5 to 10% of water.

HANS G. VESTERDAL.